United States Patent
Kruppe et al.

(10) Patent No.: US 10,591,071 B2
(45) Date of Patent: Mar. 17, 2020

(54) MANIFOLDS FOR PRESSURE RELIEF SYSTEMS

(71) Applicant: Cyrus Shank Corporation, Aurora, IL (US)

(72) Inventors: Frank Kruppe, Aurora, IL (US); Matt Powell, Aurora, IL (US)

(73) Assignee: Cyrus Shank Corporation, Aurora, IL (US)

( * ) Notice: Subject to any disclaimer, the term of this patent is extended or adjusted under 35 U.S.C. 154(b) by 14 days.

(21) Appl. No.: 15/728,125

(22) Filed: Oct. 9, 2017

(65) Prior Publication Data

US 2019/0107214 A1    Apr. 11, 2019

(51) Int. Cl.
| F16K 11/044 | (2006.01) |
| F16K 17/04 | (2006.01) |
| F16K 31/50 | (2006.01) |
| F25B 41/04 | (2006.01) |

(52) U.S. Cl.
CPC .......... *F16K 11/044* (2013.01); *F16K 17/048* (2013.01); *F16K 31/508* (2013.01); *F25B 41/04* (2013.01); *F25B 2500/07* (2013.01)

(58) Field of Classification Search
USPC .......................................... 137/625.48, 625.5
See application file for complete search history.

(56) References Cited

U.S. PATENT DOCUMENTS

| 1,293,730 | A | * | 2/1919 | Dornbrook | F22B 37/475 |
| | | | | | 122/504.1 |
| 2,645,243 | A | * | 7/1953 | Turner | F16K 17/34 |
| | | | | | 137/512 |
| 2,720,214 | A | * | 10/1955 | Rupp | F16K 35/14 |
| | | | | | 137/315.04 |
| 4,249,563 | A | * | 2/1981 | Shaw | F16K 11/052 |
| | | | | | 137/315.04 |
| 4,403,626 | A | * | 9/1983 | Paul, Jr. | F16K 11/0873 |
| | | | | | 137/118.07 |
| 4,821,772 | A | * | 4/1989 | Anderson, Jr. | F16K 11/08 |
| | | | | | 137/625.46 |
| 4,964,435 | A | * | 10/1990 | Powell | B65G 53/56 |
| | | | | | 137/625.41 |
| 5,184,773 | A | * | 2/1993 | Everingham | B60H 1/00485 |
| | | | | | 137/115.25 |
| 5,269,347 | A | * | 12/1993 | Beasley | F16K 11/163 |
| | | | | | 137/607 |
| 5,329,968 | A | * | 7/1994 | Powell | F16K 11/072 |
| | | | | | 137/625.46 |
| 5,462,086 | A | * | 10/1995 | Taylor | F16K 11/16 |
| | | | | | 137/865 |

(Continued)

OTHER PUBLICATIONS

Canadian Office Action for Application No. 3,019,480 dated Sep. 9, 2019, 4 pages.

*Primary Examiner* — John Fox
(74) *Attorney, Agent, or Firm* — Seyfarth Shaw LLP

(57) ABSTRACT

A manifold that allows replaceable pressure relief components to be installed and replaced without requiring a system shut down. The manifold allows two pressure relief valves to be installed in separate pressure relief ports. The manifold also includes a valve switch that isolates each valve independently, while allowing the system to remain in operation. For example, in a first position, the manifold directs fluid flow to a first pressure relief valve, while a second pressure relief valve is isolated.

20 Claims, 3 Drawing Sheets

(56) References Cited

U.S. PATENT DOCUMENTS 5,727,595 A * 3/1998 Eminger ............. F16K 11/0876
137/876
2017/0307088 A1* 10/2017 Rosler .................. F16K 11/044

* cited by examiner

MANIFOLDS FOR PRESSURE RELIEF SYSTEMS

FIELD

The present invention relates generally to manifolds for valves. More particularly, the present invention relates to improved manifolds for use with pressure relief valves.

BACKGROUND

Pressure relief valves and manifolds are commonly used in many industries, including the refrigeration industry. Pressure relief valves are used to control pressure within systems and containers, and flow through such systems and into and out of containers. In general, pressure relief valves are replaced every five years, or sooner if the pressure relief valve is actuated prior to the five years. Replacing these pressure relief valves and/or their components can be time consuming and labor intensive. For example, the replacement of a pressure relief valve installed in a system may require the system to be shut down in order for the pressure relief valve to be replaced.

SUMMARY

The present invention relates to a manifold that allows replaceable pressure relief components to be installed and replaced without requiring a system shut down. The manifold allows two pressure relief valves to be installed in separate pressure relief ports. The manifold also includes a valve switch that isolates each valve independently, while allowing the system to remain in operation. For example, in a first position, the manifold directs fluid flow to a first pressure relief valve, while a second pressure relief valve is isolated. In the first position, the second pressure relief valve or components thereof may be replaced. In a second position, the manifold directs fluid flow to the second pressure relief valve, while the first pressure relief valve is isolated. In the second position, the first pressure relief valve or components thereof may be replaced.

An embodiment of the present invention broadly comprises a manifold including a manifold body having an inlet port, and first and second pressure relief valve ports, where in the first and second pressure relief valve ports are adapted to receive a respective first and second pressure relief valve. A switch valve is coupled to the manifold body and selectively movable between a first position that allows fluid communication between the inlet port and the first pressure relief vale port, and a second position that allows fluid communication between the inlet port and the second pressure relief vale port.

Another embodiment of the present invention broadly comprises a manifold including a manifold body having an inlet port, and first and second pressure relief valve ports, where in the first and second pressure relief valve ports are adapted to receive a respective first and second pressure relief valve. A valve is coupled to the manifold body and movable between a first position that closes fluid communication between the inlet port and the second pressure relief vale port, and a second position that closes fluid communication between the inlet port and the first pressure relief vale port.

Another embodiment of the present invention broadly comprises a manifold and valve system. The system includes a manifold body having an inlet port, and first and second pressure relief valve ports. A first pressure relief valve is disposed in the first pressure relief port, and a second pressure relief valve is disposed in the second pressure relief port. A valve is coupled to the manifold body and movable between a first position that closes fluid communication between the inlet port and the second pressure relief vale port, and a second position that closes fluid communication between the inlet port and the first pressure relief vale port.

BRIEF DESCRIPTION OF THE DRAWINGS

For the purpose of facilitating an understanding of the invention, there are illustrated in the accompanying drawings embodiments thereof, from an inspection of which, when considered in connection with the following description, the invention, its construction and operation, and many of its advantages should be readily understood and appreciated.

DETAILED DESCRIPTION

Figure 1:
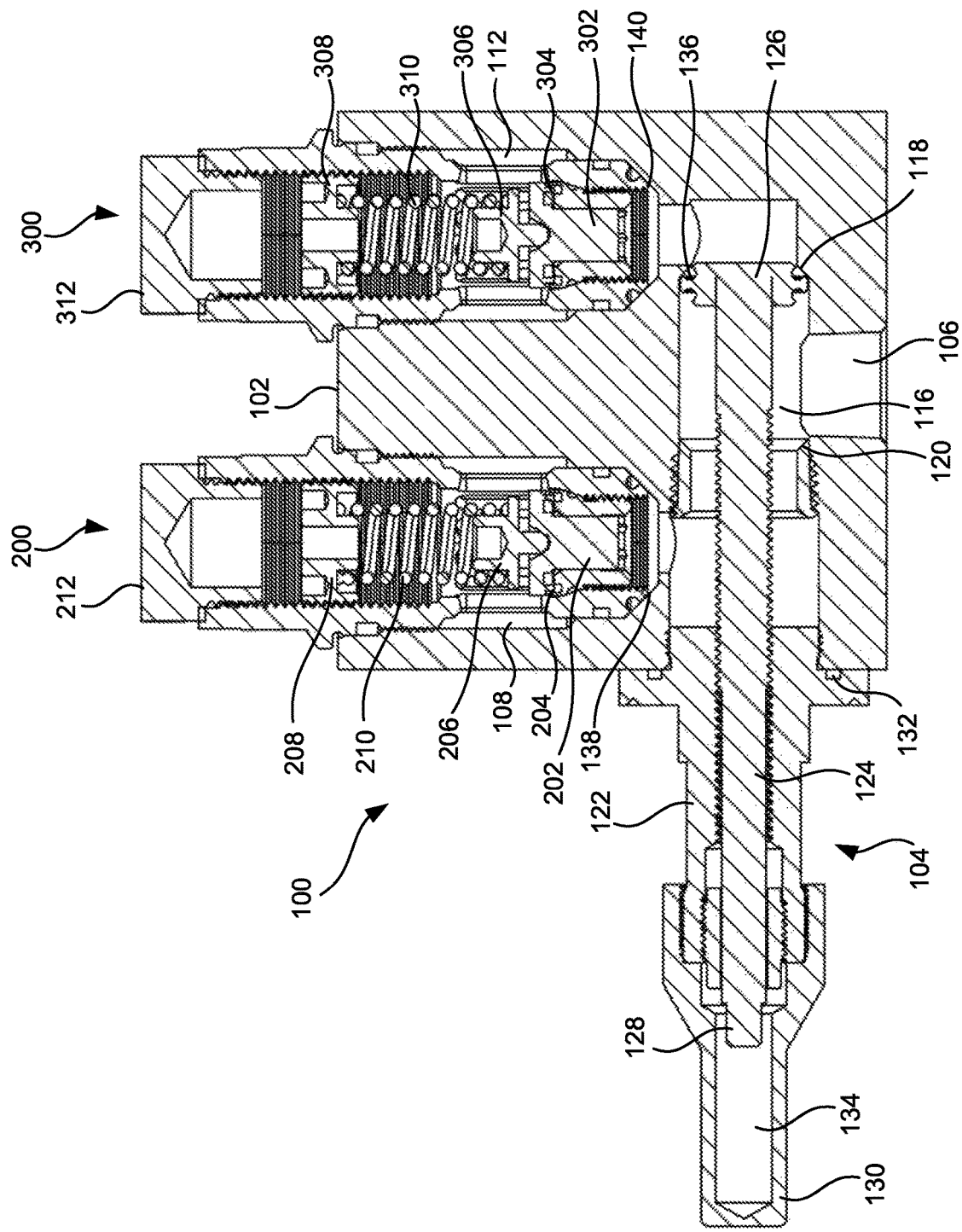
FIG. 1 is a sectional side view of a manifold in a first position according to an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

Embodiments of the present invention broadly comprise a manifold that allows replaceable pressure relief components to be installed and replaced without requiring a system shut down. The manifold allows two pressure relief valves to be installed in separate pressure relief ports. The manifold also includes a valve switch that isolates each valve independently, while allowing the system to remain in operation. For example, in a first position, the manifold directs fluid flow to a first pressure relief valve, while a second pressure relief valve is isolated. In the first position, the second pressure relief valve or components thereof may be replaced. In a second position, the manifold directs fluid flow to the second pressure relief valve, while the first pressure relief valve is isolated. In the second position, the first pressure relief valve or components thereof may be replaced.

Figure 2:
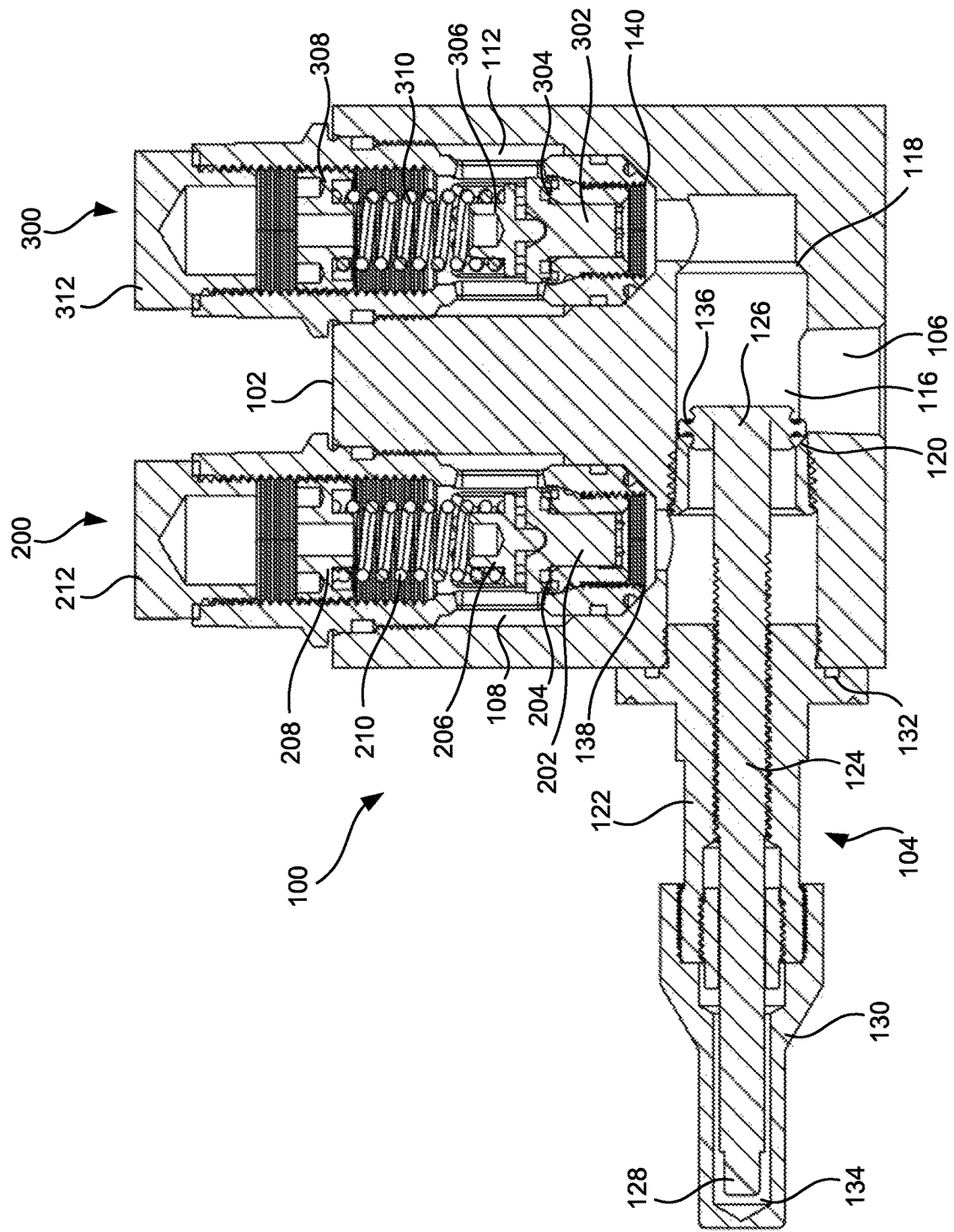
FIG. 2 is a sectional side view of the manifold in a second position according to an embodiment of the present invention.
Figure 3:
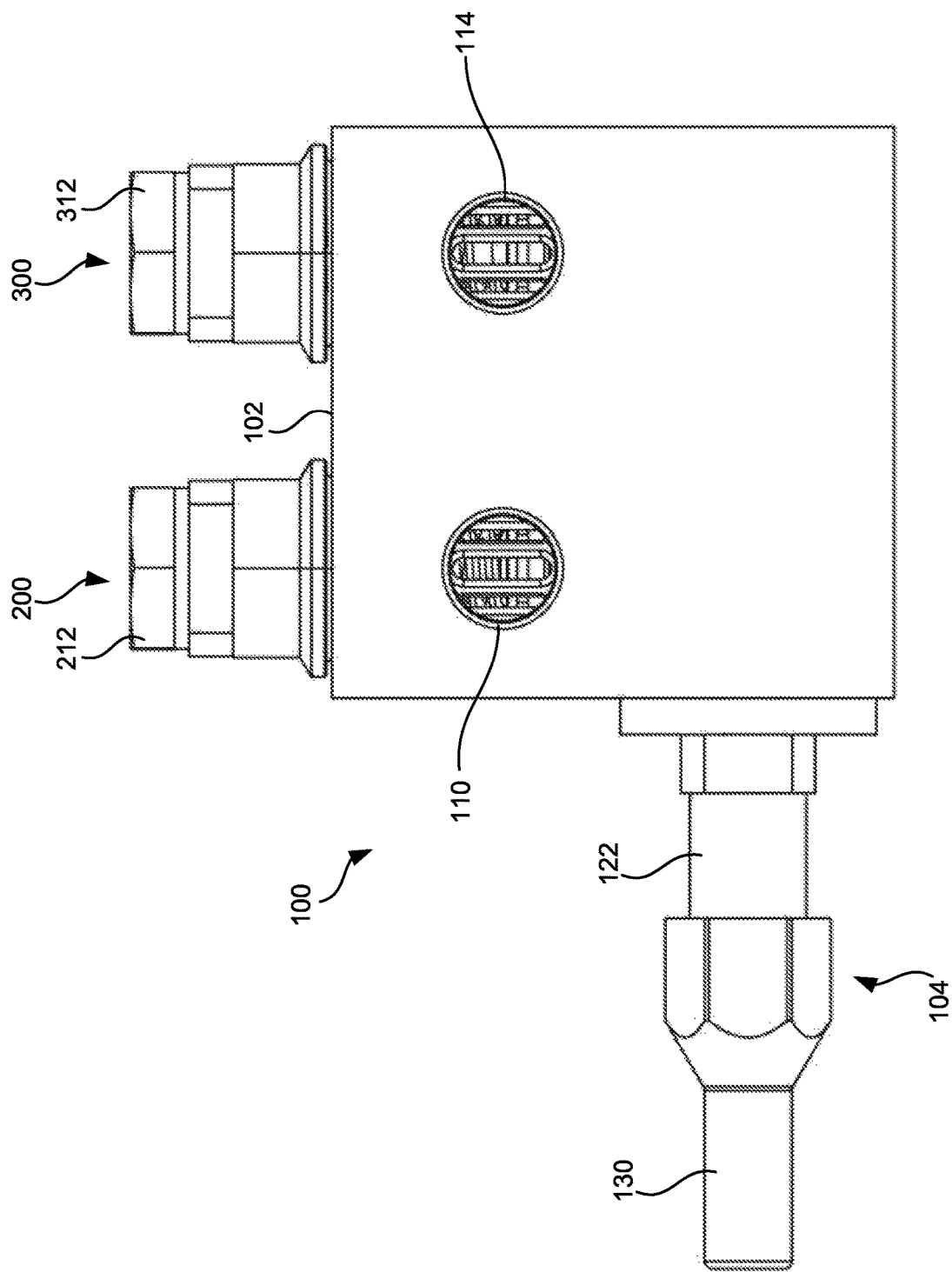
FIG. 3 is a side view of the manifold according to an embodiment of the present invention.

Referring to FIGS. 1-3, a manifold 100 includes a manifold body 102 and a switch valve 104 (also referred to as a bypass valve) coupled to the valve body 102. The manifold body 102 includes a first port 106 (also referred to as an inlet port) extending into the manifold body 102, a first pressure relief valve port 108 including a second port 110, and a second pressure relief valve port 112 including a third port 114. In operation, the first port 106 can be selectively placed in fluidic communication with either one of the first and second pressure relief valve ports 108, 112, respectively, based on a position of the switch valve 104.

The manifold body 102 also includes a fluid flow port 116 disposed downstream of the first port 106 and upstream of the first and second pressure relief valve ports 108, 112, respectively. As illustrated, the fluid flow port 116 is positioned perpendicular to each of the first port 106 and the first and second pressure relief valve ports 108, 112, respectively. However, the fluid flow port 116 may be positioned at varying angles with respect to each of the first port 106 and the first and second pressure relief valve ports 108, 112, respectively, based on an intended application.

The manifold body 102 includes first and second valve seats 118, 120, respectively. The first valve seat 118 is disposed in the fluid flow port 116, downstream of the first port 106 and upstream of the first pressure relief valve port 108. The first valve seat 118 is also disposed in a fluid flow path through fluid flow port 116 between the first and second pressure relief valve ports 108, 112 (and the respective second port and third ports 110, 114), respectively, and proximate to the second pressure relief valve port 112 (and third port 114). In a similar manner, the second valve seat 120 is disposed in the fluid flow port 116, downstream of the first port 106 and upstream of the second pressure relief valve port 112. The second valve seat 120 is also disposed in a fluid flow path through fluid flow port 116 between the first and second pressure relief valve ports 108, 112 (and the respective second port and third ports 110, 114), respectively, and proximate to the first pressure relief valve port 108 (and second port 110). The first and second valve seats 118, 120, respectively, allow the switch valve to be manipulated to independently isolate each of the first and second pressure relief valve ports 108, 112.

The switch valve 104 may include a valve housing 122, a valve stem 124, a valve head 126 coupled to the valve stem 124, an actuation member 128 coupled to the valve stem 124 opposite the valve head 126, and a cap 130. As illustrated, the valve housing 122 has a first end coupled to an end of the manifold body 102 at an opening of the fluid flow port 116 proximate to the first pressure relief valve port 108. A seal 132 (such as an O-ring or other sealing ring, for example) may optionally be disposed at the coupling location to provide a fluid tight seal between the valve housing 122 and manifold body 102.

The valve stem 124 extends through the valve housing 122 with the valve head 126 coupled to a first end of the valve stem 124 and disposed within the fluid flow port 116 of the manifold body 102. The actuation member 128 is coupled to a second end of the valve stem 124 and extends out of the valve housing 122. The cap 130 includes a channel 134 that receives the second end of the valve stem 124 and the actuation member 128. The cap 130 is also coupled to a second end of the valve housing 122, opposite the first end of the valve housing 122. The cap 130 may also be removable from the valve housing 122, and coupled to the second end of the valve housing 122 via a threaded connection. This threaded connection allows the cap 130 to be removed, exposing the actuation member 128. The valve stem 124 may also be coupled to the valve housing 122 via a threaded connection, and rotation of the actuation member 128 (and thereby the valve stem 124 and the valve head 126) causes the valve stem 124 and valve head 126 and to move between a first position and a second position.

As illustrated in FIG. 1, the valve stem 124 and valve head 126 are disposed in the first position. In the first position, the valve head 126 is disposed in engagement with the first valve seat 118. The valve head 126 may include one or more seals 136, such as an O-ring or other sealing ring, for example, disposed thereon to provide a tight seal between the valve head 126 and first valve seat 118.

In the first position, a first fluid flow path is provided between the first port 106 and the first pressure relief valve port 108. Accordingly, a first pressure relief valve 200 disposed in the first pressure relief valve port 108 is in operation. If the first pressure relief valve 200 is actuated in this position, fluid flows from the first port 106 out the second port 110 to relieve pressure.

Additionally, in the first position, the second pressure relief valve port 112 and third port 114 are isolated, and fluid flow from the first port 106 to each of the second pressure relief valve port 112 and third port 114 is closed. This allows a second pressure relief valve 300 disposed in the second pressure relief valve port 112 to be replaced, while still allowing a system in which the manifold 100 is installed to remain operational.

As illustrated in FIG. 2, the valve stem 124 and valve head 126 are disposed in the second position. In the second position, the valve head 126 is disposed in engagement with the second valve seat 120. As described above, the valve head 126 may include one or more seals 136 to provide a tight seal between the valve head 126 and second valve seat 120.

In the second position, a second fluid flow path is provided between the first port 106 and the second pressure relief valve port 112. Accordingly, the second pressure relief valve 300 disposed in the second pressure relief valve port 112 is in operation. If the second pressure relief valve 300 is actuated in this position, fluid flows from the first port 106 out the third port 114 to relieve pressure.

Additionally, in the second position, the first pressure relief valve port 108 and second port 110 are isolated, and fluid flow from the first port 106 to each of the first pressure relief valve port 108 and second port 110 is closed. This allows the first pressure relief valve 200 disposed in the first pressure relief valve port 108 to be replaced, while still allowing a system in which the manifold 100 is installed to remain operational.

Referring to FIGS. 1-3, the first pressure relief valve port 108 includes a first relief valve seat 138 upstream of the second port 110, between the second port 110 and the fluid flow port 116. Similarly, the second pressure relief valve port 112 includes a second relief valve seat 140 upstream of the third port 114, between the third port 114 and the fluid flow port 116.

The first pressure relief valve 200 may be disposed in the first pressure relief valve port 108, and the second pressure relief valve 300 may be disposed in the second pressure relief valve port 112. For brevity, the first pressure relief valve 200 is described in detail. However, it should be understood that each of the first and second pressure relief valves 200, 300, respectively include the same components and operate in a similar manner.

The first pressure relief valve 200 includes a first valve head 202, which may include a seal, such as an O-ring or other sealing ring, for example, disposed thereon to provide a tight seal between the first valve head 202 and a first seat 204. A lower guide 206 may be disposed on or coupled to the first valve head 202, on a side of the first valve head 202 distal to the first seat 204. An upper guide 208 is also disposed in or coupled to an opening of the first pressure relief valve port 108. A bias member 210, such as a spring, for example, is disposed between the lower and upper guides 206, 208, and a cap 212 may be used to close the pressure relief valve 200. The bias member 210 biases the lower guide 206 and first valve head 202 away from the upper guide 208, and causes the first valve head 202 to engage the first seat 204. This closes fluid flow between the first port 106 and second port 110 (illustrated in FIG. 3). The bias member 210 provides a bias force, thereby defining a pressure threshold. When the valve head 126 is in the first position, as illustrated in FIG. 1, and pressure within the manifold body 102 meets or exceeds the pressure threshold, the first valve head 202 is pushed against the bias force out of engagement with the first seat 204. This opens fluid flow between the first port 106 and the second port 110 (illustrated in FIG. 3), thereby releasing the pressure in the manifold body 102.

Referring to FIGS. 1 and 2, the second pressure relief valve 300 includes a second valve head 302, which may include a seal to provide a tight seal between the second valve head 302 and second seat 304. Like the first pressure relief valve 200, the second pressure relief valve 300 includes a lower guide 306, an upper guide 308, a bias member 310, and a cap 312. When the valve head 126 is in the second position, as illustrated in FIG. 2, and pressure within the manifold body 102 meets or exceeds the pressure threshold provided by the bias member 310, the second valve head 302 is pushed against the bias force out of engagement with the second seat 304. This opens fluid flow between the first port 106 and the third port 114 (illustrated in FIG. 3), thereby releasing the pressure in the manifold body 102.

It should be appreciated that the manifold 100 may be used in any number of systems that may include a pressure relief valve. One examples of such type of systems may include refrigeration systems that use ammonia or carbon dioxide as a fluid. Other examples of systems include systems that use water, oil, fuel, air, one or more chemicals, etc. as a fluid.

As used herein, the terms "coupled," "coupling," and its functional equivalents are not intended to necessarily be limited to a direct, mechanical coupling of two or more components. Instead, the term "coupled" and its functional equivalents are intended to mean any direct or indirect mechanical, electrical, or chemical connection between two or more objects, features, work pieces, and/or environmental matter. In one example, the term "coupled" and its functional equivalents are intended to mean a threaded connection. "Coupled" is also intended to mean, in some examples, one object being integral with another object.

The matter set forth in the foregoing description and accompanying drawings is offered by way of illustration only and not as a limitation. While particular embodiments have been shown and/or described, it will be apparent to those skilled in the art that changes and modifications may be made without departing from the broader aspects of the invention. The actual scope of the protection sought is intended to be defined in the following claims when viewed in their proper perspective.

What is claimed is:

1. A manifold, comprising:
a manifold body having an inlet port and first and second pressure relief valve ports, wherein the first and second pressure relief valve ports are adapted to receive respective first and second pressure relief valves; and
a switch valve coupled to the manifold body and having a valve head linearly movable between first and second positions, wherein when the valve head is in the first position, the valve head is disposed proximal to the second pressure relief port and fluid communication is allowed between the inlet port and the first pressure relief valve port, and when the valve head is in the second position, the valve head is disposed away from the second pressure relief port and fluid communication is allowed between the inlet port and the second pressure relief valve port.

2. The manifold of claim 1, wherein the switch valve includes an actuation member adapted to move the valve head between the first and second positions.

3. The manifold of claim 2, wherein the actuation member is rotatable and rotation of the actuation member is adapted to move the valve head linearly between the first and second positions.

4. The manifold of claim 1, wherein the switch valve includes a valve stem having a first end and the valve head is coupled to the first end.

5. The manifold of claim 4, wherein the manifold body includes a first valve seat disposed in a fluid flow path between the inlet port and the second pressure relief valve port, and the valve head is engaged with the first valve seat when the valve head is in the first position.

6. The manifold of claim 5, wherein the manifold body includes a second valve seat disposed in a fluid flow path between the inlet port and the first pressure relief valve port, and the valve head is engaged with the second valve seat when the valve head is in the second position.

7. The manifold of claim 6, wherein the switch valve includes a rotatable actuation member coupled to a second end of the valve stem, and rotation of the actuation member moves the valve head linearly into engagement with the first valve seat to place the valve head in the first position.

8. The manifold of claim 6, wherein the switch valve includes a rotatable actuation member coupled to a second end of the valve stem, and rotation of the actuation member moves the valve head linearly into engagement with the second valve seat to place the valve head in the second position.

9. A manifold, comprising:
a manifold body having an inlet port and first and second pressure relief valve ports; and
a valve coupled to the manifold body and having a valve head linearly movable between first and second positions, wherein when the valve head is in the first position, the valve head is disposed proximal to the second pressure relief port and fluid communication is closed between the inlet port and the second pressure relief valve port, and when the valve head is in the second position, the valve head is disposed away from the second pressure relief port and fluid communication is closed between the inlet port and the first pressure relief valve port.

10. The manifold of claim 9, wherein the switch valve includes a valve stem having a first end, and the valve head is coupled to the first end.

11. The manifold of claim 10, wherein the manifold body includes a first valve seat disposed in a fluid flow path between the inlet port and the second pressure relief valve port, and the valve head is engaged with the first valve seat when the valve head is in the first position.

12. The manifold of claim 11, wherein the manifold body includes a second valve seat disposed in a fluid flow path between the inlet port and the first pressure relief valve port, and the valve head is engaged with the second valve seat when the valve head is in the second position.

13. The manifold of claim 12, wherein the switch valve includes a rotatable actuation member coupled to a second end of the valve stem, and selective rotation of the actuation member moves the valve head linearly into engagement with either one of the first and second valve seats.

14. A manifold and valve system, comprising:
- a manifold body having an inlet port and first and second pressure relief valve ports;
- a first pressure relief valve disposed in the first pressure relief port;
- a second pressure relief valve disposed in the second pressure relief port; and
- a valve coupled to the manifold body and having a valve head linearly movable between first and second positions, wherein when the valve head is in the first position, the valve head is disposed proximal to the second pressure relief port and fluid communication is closed between the inlet port and the second pressure relief valve port, and when the valve head is in the second position, the valve head is disposed away from the second pressure relief port and fluid communication is closed between the inlet port and the first pressure relief valve port.

15. The system of claim 14, wherein the first pressure relief valve is removable from the first pressure relief port when the valve head is in the second position.

16. The system of claim 14, wherein the second pressure relief valve is removable from the second pressure relief port when the valve head is in the first position.

17. The system of claim 14, wherein the switch valve includes a valve stem having a first end and the valve head is coupled to a first end.

18. The system of claim 17, wherein the manifold body includes a first valve seat disposed in a fluid flow path between the inlet port and the second pressure relief valve port, and the valve head is engaged with the first valve seat when the valve head is in the first position.

19. The system of claim 18, wherein the manifold body includes a second valve seat disposed in a fluid flow path between the inlet port and the first pressure relief valve port, and the valve head is engaged with the second valve seat when the valve head is in the second position.

20. The system of claim 19, wherein the switch valve includes a rotatable actuation member coupled to a second end of the valve stem, and selective rotation of the actuation member moves the valve head linearly into engagement with either one of the first and second valve seats.

* * * * *